(12) United States Patent
Regaard et al.

(10) Patent No.: US 12,053,840 B2
(45) Date of Patent: Aug. 6, 2024

(54) METHOD FOR DETERMINING A PARAMETER OF A PROCESSING PROCESS AND PROCESSING MACHINE

(71) Applicant: TRUMPF Werkzeugmaschinen GmbH + Co. KG, Ditzingen (DE)

(72) Inventors: Boris Regaard, Stuttgart (DE); Winfried Magg, Ditzingen (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 398 days.

(21) Appl. No.: 17/226,094

(22) Filed: Apr. 9, 2021

(65) Prior Publication Data

US 2021/0229220 A1    Jul. 29, 2021

Related U.S. Application Data

(63) Continuation of application No. PCT/EP2019/077612, filed on Oct. 11, 2019.

(30) Foreign Application Priority Data

Oct. 12, 2018 (DE) ...................... 10 2018 217 526.8

(51) Int. Cl.
*B23K 26/70* (2014.01)
*B23K 26/38* (2014.01)

(52) U.S. Cl.
CPC ............ *B23K 26/705* (2015.10); *B23K 26/38* (2013.01)

(58) Field of Classification Search
CPC .... B23K 26/032; B23K 26/082; B23K 26/21; B23K 26/0643; B23K 26/0648;
(Continued)

(56) References Cited

U.S. PATENT DOCUMENTS

| | | | | |
|---|---|---|---|---|
| 6,268,585 B1* | 7/2001 | Ichikawa | ............. | B23K 26/361 219/121.73 |
| 6,670,574 B1* | 12/2003 | Bates | ................... | B23K 26/032 219/121.64 |

(Continued)

FOREIGN PATENT DOCUMENTS

| | | |
|---|---|---|
| DE | 102005022095 A1 | 11/2006 |
| DE | 102008052592 A1 | 4/2010 |

(Continued)

*Primary Examiner* — Jimmy Chou
(74) *Attorney, Agent, or Firm* — Leydig, Voit & Mayer, Ltd.

(57) ABSTRACT

A method determines at least one parameter for a process quality during a processing process. The method includes: processing a workpiece while moving a processing tool and the workpiece relative to one another; monitoring a region on the workpiece; determining the at least one parameter for the process quality based on the monitored region; and determining at least one position-dependent parameter for the process quality based on a plurality of measured values of the at least one parameter at a same processing position, or determining at least one direction-dependent parameter for the process quality based on the plurality of measured values of the at least one parameter in a same processing direction.

7 Claims, 2 Drawing Sheets

(58) Field of Classification Search
CPC .... B23K 31/125; B23K 26/705; B23K 26/38; G01B 11/22
USPC ..................................................... 219/121.8
See application file for complete search history.

(56) References Cited

U.S. PATENT DOCUMENTS

| | | | | |
|---|---|---|---|---|
| 6,791,057 B1* | 9/2004 | Kratzsch | ............... | B23K 26/24 |
| | | | | 219/121.62 |
| 7,804,043 B2* | 9/2010 | Deshi | ............... | B23K 26/0624 |
| | | | | 219/121.72 |
| 7,989,730 B2* | 8/2011 | Regaard | ............... | B23K 26/04 |
| | | | | 219/121.63 |
| 8,198,566 B2* | 6/2012 | Baird | ............... | B23K 26/40 |
| | | | | 219/121.68 |
| 9,427,823 B2* | 8/2016 | Alfille | ............... | B23K 26/1437 |
| 9,517,533 B2* | 12/2016 | Uchida | ............... | G01B 11/30 |
| 10,578,428 B2* | 3/2020 | Strebel | ............... | G01B 9/02091 |
| 11,396,062 B2* | 7/2022 | Moser | ............... | B23K 26/21 |
| 11,511,370 B2* | 11/2022 | Sakurai | ............... | G01B 11/02 |
| 2006/0011592 A1* | 1/2006 | Wang | ............... | B23K 26/034 |
| | | | | 219/121.64 |
| 2008/0246973 A1 | 10/2008 | Regaard | | |
| 2010/0133243 A1* | 6/2010 | Nomaru | ............... | B23K 26/032 |
| | | | | 219/121.67 |
| 2010/0288739 A1* | 11/2010 | Lee | ............... | H05K 3/0035 |
| | | | | 219/121.67 |
| 2011/0109911 A1* | 5/2011 | Podoleanu | ............... | A61B 3/102 |
| | | | | 356/451 |
| 2011/0210107 A1 | 9/2011 | Bauer et al. | | |
| 2012/0138586 A1* | 6/2012 | Webster | ............... | B23K 26/20 |
| | | | | 219/121.64 |
| 2012/0211474 A1* | 8/2012 | Hayashimoto | ..... | B23K 26/0665 |
| | | | | 219/121.64 |
| 2012/0285936 A1* | 11/2012 | Urashima | ............... | G01B 9/02091 |
| | | | | 219/121.63 |
| 2012/0318775 A1* | 12/2012 | Schwarz | ............... | B23K 26/032 |
| | | | | 356/606 |
| 2013/0043225 A1* | 2/2013 | Schurmann | ............... | B23K 26/044 |
| | | | | 219/121.64 |
| 2013/0062324 A1* | 3/2013 | Dorsch | ............... | B23K 26/032 |
| | | | | 219/121.63 |
| 2013/0068738 A1* | 3/2013 | Schurmann | ............... | B23K 26/03 |
| | | | | 219/121.72 |
| 2013/0178952 A1 | 7/2013 | Wersborg et al. | | |
| 2013/0319980 A1* | 12/2013 | Hesse | ............... | B23K 26/032 |
| | | | | 219/121.62 |
| 2014/0138363 A1* | 5/2014 | Hammann | ............... | B23K 26/03 |
| | | | | 219/121.78 |
| 2015/0014889 A1* | 1/2015 | Goya | ............... | B23K 26/0652 |
| | | | | 219/121.72 |
| 2015/0165549 A1 | 6/2015 | Beutler | | |
| 2015/0210013 A1 | 7/2015 | Teulet | | |
| 2015/0352666 A1* | 12/2015 | Fujita | ............... | B23K 26/046 |
| | | | | 219/121.61 |
| 2016/0039045 A1* | 2/2016 | Webster | ............... | B23K 26/14 |
| | | | | 356/450 |
| 2016/0039046 A1* | 2/2016 | Franz | ............... | B23K 26/24 |
| | | | | 219/121.64 |
| 2016/0059350 A1* | 3/2016 | Schoenleber | ............... | B23K 26/04 |
| | | | | 219/121.81 |
| 2016/0114434 A1* | 4/2016 | Regaard | ............... | B23K 26/046 |
| | | | | 219/121.81 |
| 2016/0193692 A1* | 7/2016 | Regaard | ............... | B23K 31/125 |
| | | | | 219/121.62 |
| 2016/0202045 A1* | 7/2016 | Schönleber | ............... | B23K 26/03 |
| | | | | 356/497 |
| 2016/0354867 A1* | 12/2016 | Matsuoka | ............... | B23K 26/24 |
| 2016/0356595 A1* | 12/2016 | Lessmueller | ............... | B23K 26/044 |
| 2017/0001261 A1* | 1/2017 | Fujiwara | ............... | B23K 26/082 |
| 2017/0043431 A1* | 2/2017 | Kuba | ............... | B23K 26/032 |
| 2017/0095885 A1* | 4/2017 | Zhang | ............... | B23K 26/21 |
| 2017/0109874 A1* | 4/2017 | Hallasch | ............... | B23K 26/60 |
| 2017/0113300 A1 | 4/2017 | Bader et al. | | |
| 2017/0120337 A1* | 5/2017 | Kanko | ............... | B33Y 10/00 |
| 2017/0259373 A1* | 9/2017 | Albert | ............... | B23K 31/125 |
| 2017/0326669 A1* | 11/2017 | Moser | ............... | B23K 15/0013 |
| 2017/0334019 A1* | 11/2017 | Izumi | ............... | B23K 26/032 |
| 2018/0126491 A1* | 5/2018 | Nakagawa | ............... | B23K 26/244 |
| 2018/0221989 A1* | 8/2018 | Matsuoka | ............... | B23K 26/0876 |
| 2018/0372483 A1* | 12/2018 | Moser | ............... | G01B 11/22 |
| 2019/0041196 A1* | 2/2019 | Strebel | ............... | G01B 11/22 |
| 2019/0126389 A1* | 5/2019 | Fukae | ............... | B23K 26/0604 |
| 2019/0240785 A1* | 8/2019 | Magg | ............... | B23K 26/0626 |
| 2019/0375051 A1* | 12/2019 | Regaard | ............... | B23K 26/38 |
| 2020/0198049 A1* | 6/2020 | Yokoyama | ............... | B23K 31/003 |
| 2020/0262004 A1* | 8/2020 | Moser | ............... | B23K 26/702 |
| 2020/0361038 A1* | 11/2020 | Takechi | ............... | B23K 26/082 |
| 2021/0031298 A1* | 2/2021 | Sakai | ............... | B23K 26/043 |

FOREIGN PATENT DOCUMENTS

| | | | | |
|---|---|---|---|---|
| DE | 102011079083 A1 | | 1/2013 | |
| DE | 102016005021 A1 | * | 9/2016 | ............ B23K 26/03 |
| EP | 1147366 B1 | | 6/2005 | |
| EP | 1497851 B1 | | 1/2006 | |
| EP | 2357057 A1 | | 8/2011 | |
| EP | 2883647 A1 | | 6/2015 | |
| EP | 3159093 A1 | | 4/2017 | |
| JP | 2008132514 A | | 6/2008 | |
| JP | 2016055326 A | | 4/2016 | |
| WO | WO 2012107331 A1 | | 8/2012 | |
| WO | WO 2015036140 A1 | | 3/2015 | |
| WO | WO 2018069291 A1 | | 4/2018 | |

* cited by examiner

METHOD FOR DETERMINING A PARAMETER OF A PROCESSING PROCESS AND PROCESSING MACHINE

CROSS-REFERENCE TO PRIOR APPLICATIONS

This application is a continuation of International Patent Application No. PCT/EP2019/077612, filed on Oct. 11, 2019, which claims priority to German Patent Application No. DE 10 2018 217 526.8, filed on Oct. 12, 2018. The entire disclosure of both applications is hereby incorporated by reference herein.

FIELD

The present invention relates to a method for determining at least one parameter for the process quality during a processing process.

BACKGROUND

WO2012107331A1 describes, inter alia, that a cutting front angle of a laser cutting process can be determined as a parameter for the process quality.

A method and a device are described in WO2015036140A1, in which, based on the detected interaction region, the cutting front angle of a kerf formed during a laser cutting process is determined as a characteristic parameter of the cutting process. The cutting front angle represents a parameter for the process quality or for the process robustness in particular in the case of flame cutting.

A method and a device are described in WO2018069291A1, in which at least one measured variable for the course of the gap width of a kerf in the thickness direction of the workpiece, in particular for an angle between the two cut flanks of the kerf, is determined based on at least one image of a region of the workpiece to be monitored. The (aperture) angle between the two cut flanks of the kerf represents a parameter for the process quality or for the process robustness in particular in the case of fusion cutting.

A method and a device for determining a lateral relative movement between a processing head and a workpiece during the processing of the workpiece are described in DE102005022095A1. In the method, the surface of the workpiece is illuminated in the region of the processing head using optical radiation and optical radiation reflected from the surface of the workpiece is repeatedly detected in a location-resolved manner using an optical detector in order to obtain optical reflection patterns of the surface of the workpiece at different times. The lateral relative movement is determined by comparing the chronologically successive reflection patterns.

A method for monitoring laser cutting processes in the high-power range with interruption of the cutting process and a corresponding method are described in EP3159093A1. In the method, at least one subsection of a processing section cut in the course of a first partial processing process is scanned and at least one quality feature of the processing process is determined based on the scanning result and compared to predefined quality specifications. For the cutting process, an online process monitoring method can additionally be carried out at least temporarily, wherein, depending on the result of the comparison, an adaptation of at least one monitoring parameter of an online monitoring parameter set takes place.

A method for processing a workpiece is described in DE 102011079083A1, in which a surface topography of the workpiece to be processed is detected at least in sections and a minimal target distance of the processing head from the workpiece is determined based on the previously detected surface topography.

Measuring the laser energy density in a focal plane depending on the position by means of a power meter for the laser cutting of a substrate and using the measured values in order to ensure a constant laser energy density at sampled points in a field of view on the substrate by regulating the pulse energy and/or the pulse repetition rate is described in EP1497851. The laser is controlled by a machine-specific "laser cutting strategy file".

SUMMARY

In an embodiment, the present invention provides a method that determines at least one parameter for a process quality during a processing process. The method includes: processing a workpiece while moving a processing tool and the workpiece relative to one another; monitoring a region on the workpiece; determining the at least one parameter for the process quality based on the monitored region; and determining at least one position-dependent parameter for the process quality based on a plurality of measured values of the at least one parameter at a same processing position, or determining at least one direction-dependent parameter for the process quality based on the plurality of measured values of the at least one parameter in a same processing direction.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
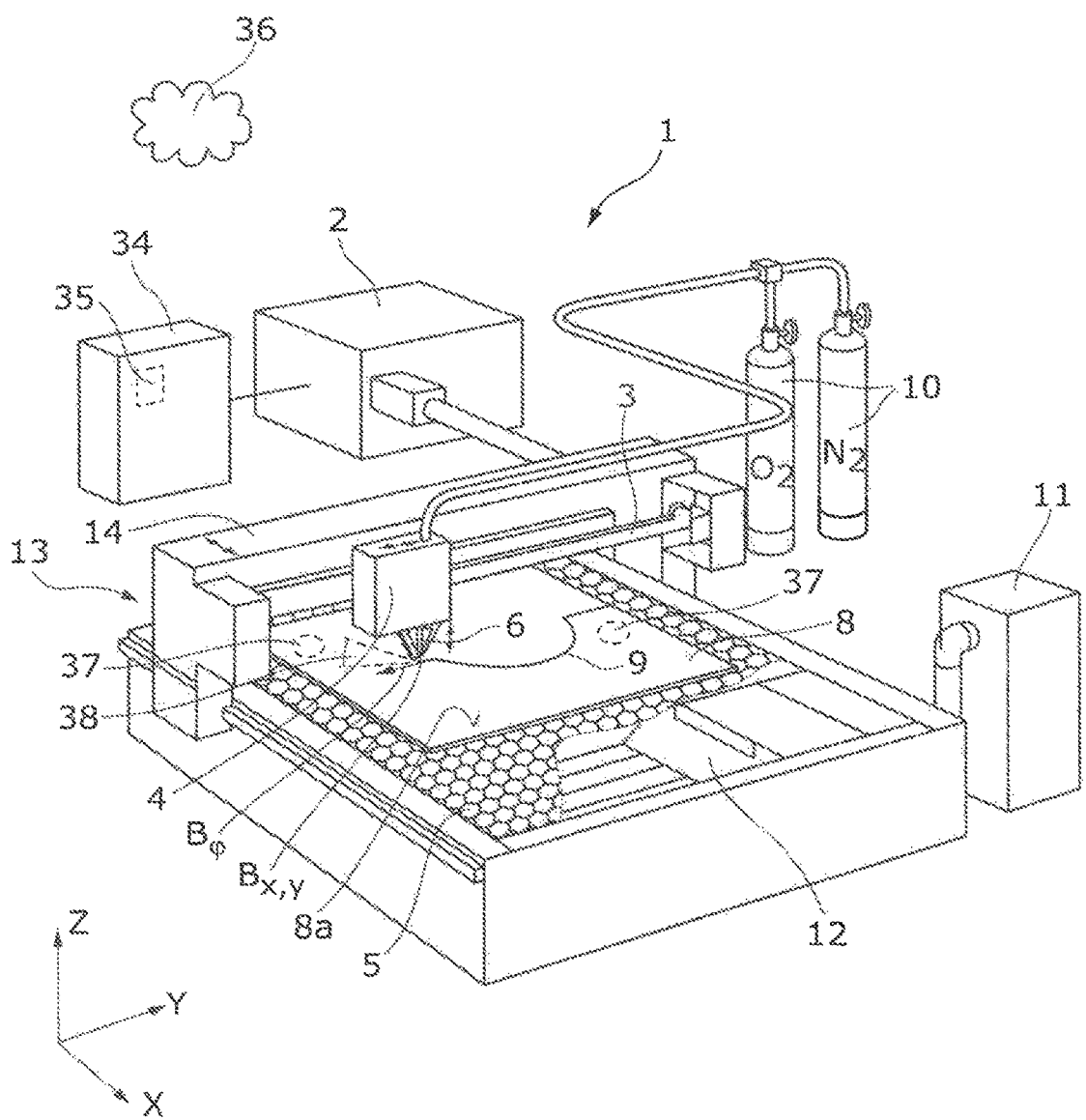
FIG. 1 shows a schematic illustration of an exemplary embodiment of a processing machine in the form of a laser processing machine for cutting processing of a workpiece.

Embodiments of the present invention provide a method and a processing machine in which at least one parameter of a processing process is determined in order to recognize faults on a processing machine used for the processing.

According to an embodiment of the present invention, a method is provided that includes the steps: determining at least one position-dependent parameter for the process quality based on a plurality of measured values of the at least one parameter at the same processing position and/or at least one direction-dependent parameter for the process quality based on a plurality of measured values of the at least one parameter in the same processing direction, in particular in the same processing direction at one and the same processing position. In the sense of this application, the term process quality is also understood as meaning the process robustness, i.e., both terms are used synonymously. A parameter for the process quality is also understood in the sense of this application as meaning a parameter which influences the process quality.

In particular processing machines for planar processing, for example 2D laser cutting machines, can have direction-dependent and/or position-dependent faults, which influence the process result or the process quality. Such faults are typically only dependent on the processing position or on the processing direction, but are essentially independent of the geometry of the contour to be cut, the type of the processing process (for example flame cutting or fusion cutting), and the processing parameters. A fault is also understood in the sense of this application as meaning a deviation from a reference state.

For example, position-dependent faults can occur on (support) webs arranged in the working area and direction-dependent faults can be attributed to polarization and/or caustic inhomogeneities of the laser beam, to inhomogeneities of the gas flow or gas pressure of a gas flow exiting from a nozzle during the processing (for example due to damage to the nozzle or due to a incompletely symmetrical construction of the processing head which supplies the gas to the nozzle), to a material anisotropy, etc.

With the aid of the above-described method, it is possible to recognize or to locate such direction-dependent and/or position-dependent faults. For this purpose, it can be beneficial to eliminate also occurring deviations, which are induced by non-position-dependent or direction-dependent faults, by a sufficient number of measured values of the parameter, so that an (essentially exclusively) position-dependent or direction-dependent parameter is formed. The number of measured values of the parameter which are required for the elimination is dependent on how significant the direction-dependent and/or position-dependent fault is. The number of measured values can reach from three measured values (in extreme cases) to several hundred measured values if the position dependence and/or direction dependence of the fault is comparatively small. For example, in the case of a direction-dependent fault induced by a slightly inhomogeneous beam caustic of the laser beam, a high number of measured values can be required, while, in the case of an optical signal of a laser cutting sensor system which is detected when moving over a support web, a small number of measured values of the parameter is required to eliminate the contribution of non-position-dependent faults.

A direction-dependent parameter is understood in the sense of this application as meaning a parameter that is dependent on the processing direction and that is parameterized, for example, by an angle (between 0° and 360°). The at least one direction-dependent parameter can possibly be determined independently of the respective processing position, i.e., it is not differentiated according to the processing position, but rather measured values at processing positions from the entire processing field are used for determining the direction-dependent parameter. In general, the direction-dependent parameter is determined at a respective processing position, however, i.e., the measured values which are used for determining the direction-dependent parameter are all measured at the same processing position.

In one variant, a statistical analysis of the plurality of measured values is carried out to determine the position-dependent parameter and/or the direction-dependent parameter for the process quality. In the simplest case, the position-dependent or direction-dependent parameter can form the mean value of the measured values determined at the respective processing position or in the respective processing direction. However, it is apparent that the mean value does not represent a suitable measure in every case to determine the position-dependent or direction-dependent parameter from the plurality of measured values, but rather another statistical measure, for example the median, or more complex statistical evaluations can be performed for the elimination of non-direction-dependent or non-position-dependent faults.

In a further variant, the parameter is detected continuously during a processing process, for example by means of a sensor or a monitoring device, and an instantaneously determined measured value of the parameter is assigned to a respective processing position and/or to a respective processing direction. For the monitoring of the process quality during the processing, typically at least one parameter for the process quality is continuously monitored, for example to be able to engage instantaneously in the processing process. The determination of the parameter during the processing process takes place along a predetermined trajectory, which corresponds in a laser cutting process to the cut contour and which is known to the machine controller. The parameter determined at a specific time can therefore be assigned to a processing position and to an (instantaneous) processing direction. If necessary, the instantaneous processing direction and possibly also the processing position can be detected by a sensor or a monitoring device as well, as is described, for example, for the processing direction or the lateral relative movement between processing tool and workpiece in DE102005022095A1, which is cited at the outset. The processing position or the processing direction are typically assigned with a predetermined discretization, i.e., with a predetermined grid measure, to the continuously detected parameter.

In a further variant, processing positions are determined based on the position-dependent parameter, which form at least one fault position region during the processing and/or processing directions are determined based on the direction-dependent parameter, which form at least one fault angle region during the processing. Preferred positions and preferred angles or fault positions and fault angles can be determined by frequent measurement at the same processing position or in the same processing direction. The fault positions or the fault angles can also be determined with the aid of statistical methods based on the position-dependent or direction-dependent parameter. In the simplest case, the fault position regions or the fault angle regions are determined based on a comparison of the position-dependent or of the direction-dependent parameter with a threshold value; processing positions or directions at which the parameter exceeds or falls below the threshold value are identified as fault position regions or as fault angle regions.

For example, in laser processing machines, preferred angle regions or fault angle regions can be determined, the causes of which lie, for example in the processing beam (polarization, caustic inhomogeneity, angle of incidence, etc.), in the movement devices or drives used for the movement of the processing tool and/or of the workpiece (lateral and/or longitudinal oscillations), or, for example, in the material of the workpiece (anisotropy, rolling direction).

Fault position regions can accordingly be defined, which are dependent on the processing position or on the position in the working area and which can have their cause, for example, in the laser beam guiding (in particular in the case of a $CO_2$ laser), in the mechanical suspension of the processing tool, for example in the form of a laser processing head, (e.g., unfavorable torques in the case of protruding supports, gearwheel play, mechanical tolerances, etc.), the mechanical mounting of the workpiece (metal sheet), e.g., a pallet oscillation, poor or too few support webs, the support points of the webs (potential flaws when passing over the support point, process influencing due to slagged webs), or the workpiece or properties of the metal sheet (thinning in the edge region, soiled regions).

In one variant, processing positions and/or processing directions during the movement of the processing tool and of the workpiece relative to one another are defined in dependence on the determined position-dependent parameter, in particular on the fault position region, and/or based on the direction-dependent parameter, in particular on the fault angle region. The knowledge about regions and/or directions having particularly good or having particularly poor process properties can be used to avoid fault position regions or fault angle regions during the processing, which can be realized, for example, by suitable nesting or arrangement of the cut contours of the workpiece parts to be cut free from the workpiece, i.e., by suitable process planning of the processing process. It is apparent that a deliberate error diagnosis can also be carried out, i.e., a deliberate check can be carried out of the causes for the fault(s) at a respective fault position region or at a respective fault angle region. Both the error diagnosis and also the optimization of the work planning, i.e., avoiding the critical fault position regions or the fault angle regions, can take place fully automatically without action of an operator.

In a further variant, the plurality of the measured values of the at least one parameter is determined during multiple processing processes on the same processing machine, and/or the position-dependent parameter and/or the direction-dependent parameter is/are determined on multiple structurally identical processing machines. In the first case, position-dependent or direction-dependent parameters are determined on a specific processing machine in order to identify flaws; in the second case, position-dependent or direction-dependent parameters are determined on multiple structurally identical processing machines. By way of the comparison between the polarization-dependent or direction-dependent parameters which were determined on multiple structurally identical processing machines, the influence of the individual processing machine can be eliminated and systematic weak points of the machine construction of a respective type of processing machine can be recognized.

In one refinement, the plurality of the measured values of the at least one parameter is determined during multiple processing processes on the same processing machine and a temporal change of the measured values is taken into consideration during the determination of the position-dependent parameter and/or the direction-dependent parameter. The measured values of the at least one parameter which are determined on successive processing processes on one and the same processing machine can be subjected to a temporal change. If the parameter for which the measured values are determined is, for example, a focal position in the beam direction of the laser beam, this can change over time, for example, due to soiling of a processing optical unit, since this can lead to a so-called thermal lens, which results in a change of the focal position. For the case in which a statistically significant temporal change of the measured values is established, this change can be taken into consideration in the determination of the parameter.

In general, it is possible to take into consideration the temporal change of the measured values in that older measured values are weighted less strongly in the determination of the parameter than measured values which were determined during processing processes which were not as long ago. Measured values which were determined during processing processes a very long time ago can also optionally no longer be taken into consideration in the determination of the parameter. In particular, these measured values can possibly be discarded or deleted.

In a further variant, the method comprises storing the determined position-dependent parameter and/or the fault position region and/or the determined direction-dependent parameter and/or the fault direction region in a data memory. Data about the fault position region(s) or the fault position direction(s) are collected in the data memory, for example in the machine controller, on a central computer, or in the cloud. In particular, the position-dependent or angle-dependent parameter(s) or the fault position region(s) or angle region(s) of multiple processing machines which are operated at different locations can be brought together in the data memory.

In one variant, the parameter is selected from the group comprising: cutting front angle of a cutting front of a kerf and opening angle between two cutting flanks of the kerf. The cutting front angle represents a parameter for the process quality in particular in the case of flame cutting and can be determined, for example, in the way described in WO2012107331A1, cited at the outset, or in the way described in WO2015036140A1, cited at the outset. The reduction of the width of the kerf of the cutting gap in the thickness direction of the workpiece, which can be determined, for example, by the opening angle between the cutting flanks of the kerf or by a measured variable indicative thereof (cf. WO2018069291A1, cited at the outset), represents a parameter for the process quality or the process robustness in the case of fusion cutting.

In a further variant, the parameter is selected from the group comprising: positioning accuracy and directional accuracy during the movement of the processing tool and the workpiece relative to one another. The positioning accuracy or the directional accuracy also has an influence on the process quality and is dependent on the processing position or on the processing direction due to the suspension of the processing tool or the mounting of the workpiece. The directional accuracy during the processing can be determined, for example, with the aid of the method described in DE102005022095A1, cited at the outset, which describes the lateral relative movement between processing tool and workpiece. The directional accuracy of the relative movement at a respective processing position can be determined by a comparison to the target processing direction which results from the path planning. Correspondingly, the instantaneous processing position can also be determined via a suitable sensor or a suitable monitoring device and compared to the target processing position resulting from the path planning in order to determine the positioning accuracy.

A further aspect of the invention relates to a processing machine of the type mentioned at the outset, in which the evaluation device is configured or programmed to determine at least one position-dependent parameter for the process quality based on a plurality of measured values of the at least one parameter at the same processing position and/or at least one direction-dependent parameter for the process quality based on a plurality of measured values of the at least one parameter along the same processing direction, in particular along the same processing direction at one and the same processing position. As was described further above in conjunction with the method, position-dependent and/or direction-dependent faults can be determined on the processing machine based on the position-dependent and/or direction-dependent parameter. The processing machine can in particular be a so-called 2D laser cutting machine, in which the workpiece typically rests on a workpiece support and the processing tool in the form of a laser processing head is moved in the lateral direction over the workpiece.

In one embodiment, the evaluation device is configured or programmed to carry out a statistical analysis of the plurality of measured values to determine the position-dependent parameter and/or the direction-dependent parameter for the process quality. As has been described above, a statistical analysis or evaluation of the measured values can be used to eliminate influences on the process quality, which are not dependent on the processing position and/or on the processing direction.

In a further embodiment, the monitoring device is designed to continuously monitor the at least one parameter and the evaluation device is designed to assign an instantaneously determined measured value of the parameter to a respective processing position and/or to a respective processing direction. The evaluation device can be provided in the processing tool, but can also form a part of a control device of the processing machine.

In a further embodiment, the evaluation device is configured or programmed to determine, based on the position-dependent parameter, processing positions which form at least one fault position region during the processing and/or to determine, based on the direction-dependent parameter, processing directions which form at least one fault angle region during the processing. Reference is made to the above statements in conjunction with the method with respect to this embodiment.

In a further embodiment, the processing machine comprises a control device for controlling the movement of the processing tool and the workpiece relative to one another, which is preferably configured to establish processing positions and/or processing directions during the movement of the processing tool and the workpiece relative to one another in dependence on the determine position-dependent parameter, in particular on the fault position region, and/or based on the direction-dependent parameter, in particular on the fault angle region. As was described further above, the fault position regions or the fault angle regions can be taken into consideration during the work planning or in the occupancy plan of the metal sheet, in order to avoid them as much as possible during the processing process.

In one embodiment, the monitoring device and the evaluation device are configured to determine, based on the monitored region as a parameter for the process quality, a cutting front angle of a cutting front of a kerf, an opening angle between two cut flanks of the kerf, a positioning accuracy and/or a directional accuracy during the movement of the processing tool and the workpiece relative to one another. The parameter which describes the positioning accuracy and/or directional accuracy during the relative movement can be, for example, a deviation of the actual movement from the target movement, which is to be attributed, for example, to an uneven movement (rattling) of the drives. Further parameters which can be determined are the cutting gap width or the deviation of the cutting gap width from a target cutting gap width, the beam location of a processing nozzle, the deviation of the distance between the (processing) nozzle and the workpiece from a target value, the deviation of the pressure or gas flow rate through the nozzle from a target value, the electrical resistance between the nozzle and the workpiece, and the radiation intensity coaxially measured by means of a sensor in dedicated or predetermined wavelength bands, for example by means of a photodiode in the piercing sensor system. These parameters can be determined in particular in the way described further above in conjunction with the method.

Further advantages of the invention result from the description and the drawing. The features mentioned above and the features also stated below can also be used as such or in multiples in any arbitrary combinations. The embodiments shown and described are not to be understood as an exhaustive list, but rather have exemplary character for describing the invention.

In the following description of the drawings, identical reference signs are used for equivalent or functionally equivalent components.

FIG. 1 shows a laser processing machine 1 having a laser source 2, a laser processing head 4, and a workpiece support 5. A laser beam 6 generated by the laser source 2 is guided by means of a beam guide 3 with the aid of deflection mirrors to the laser processing head 4 and focused therein and also aligned with the aid of mirrors perpendicularly to the surface 8a of a workpiece 8, i.e., the beam axis (optical axis) of the laser beam 6 extends perpendicularly to the workpiece 8. In the example shown, the laser source 2 is a $CO_2$ laser source. Alternatively, the laser beam 6 can be generated, for example, by a solid-state laser.

For laser cutting of the workpiece 8, it is first pierced using the laser beam 6, i.e., the workpiece 8 is melted or oxidized in a punctiform manner at one point and the melt resulting in this case is discharged. The laser beam 6 is then moved over the workpiece 8 so that a continuous kerf 9 results, along which the laser beam 6 cuts through the workpiece 8.

Both the piercing and also the laser cutting can be assisted by adding a gas. Oxygen, nitrogen, compressed air and/or application-specific gases can be used as cutting gases 10. Resulting particles and gases can be suctioned off with the aid of a suction device 11 from a suction chamber 12.

The laser processing machine 1 also comprises a movement device 13 for the movement of the laser processing head 4 and of the workpiece 8 relative to one another. In the example shown, the workpiece 8 rests during the processing on the workpiece support 5 and the laser processing head 4 is moved during the processing along two axes X, Y of a XYZ coordinate system. For this purpose, the movement device 13 has a gantry 14 displaceable in the X direction with the aid of a drive indicated by a double arrow. The laser processing head 4 can be displaced in the X direction with the aid of a further drive of the movement device 13 indicated by a double arrow, in order to be moved to arbitrary processing positions $B_{X,Y}$ in the X direction and in the Y direction in a working area predetermined by the displaceability of the laser processing head 4 or by the workpiece 8. At a respective processing position $B_{X,Y}$, the laser beam 6 has an (instantaneous) processing direction $B_\varphi$, which is described by a processing angle $\varphi$, which is measured (arbitrarily) starting from the negative Y-direction and in the example shown in FIG. 1 is $\varphi=0°$.

Figures 2A, 2B:
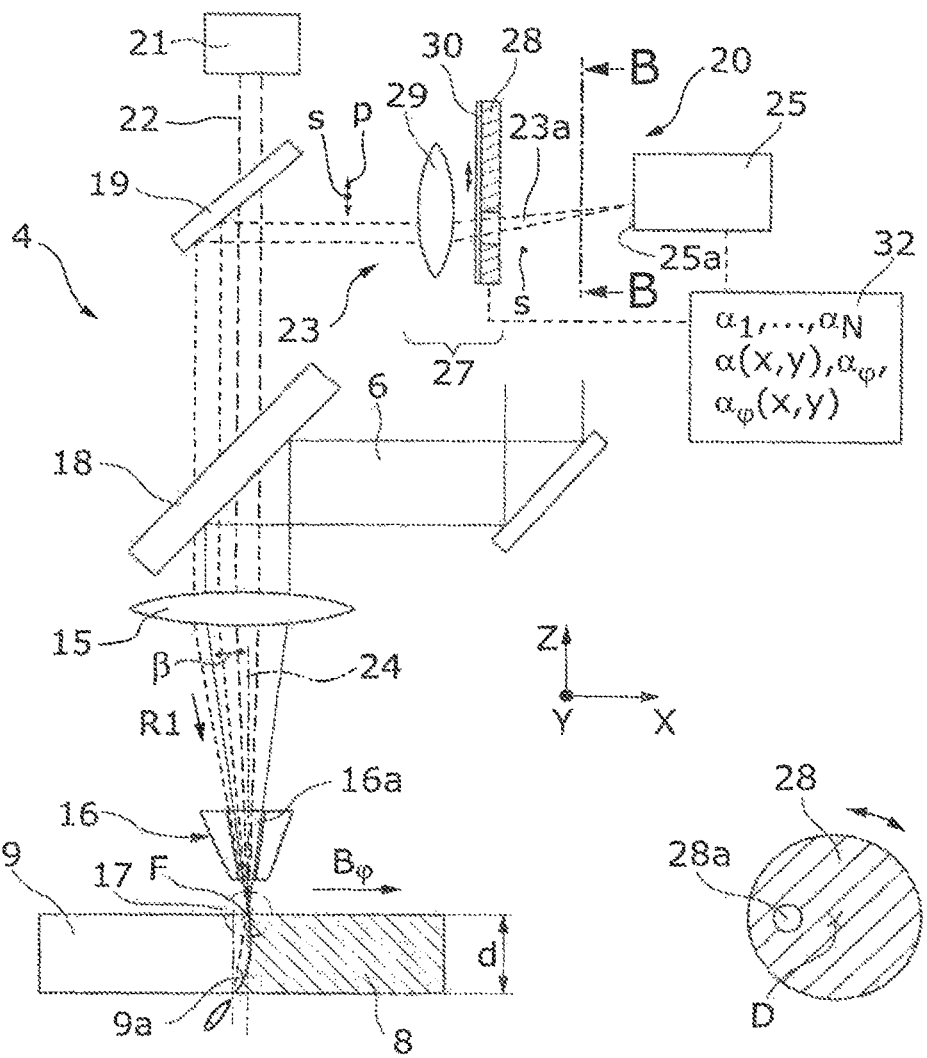
FIG. 2a and FIG. 2b show an illustration of a laser processing head of the laser processing machine of FIG. 1, which has a monitoring device, and an aperture of the monitoring device.

As may be seen in FIG. 2a, the laser beam 6 is focused on the workpiece 8 by means of a focusing device in the form of a focusing lens 15 to carry out cutting processing on the workpiece 8. The focusing lens 15 is in the example shown a lens made of zinc selenide, which focuses the laser beam 6 through a laser processing nozzle 16, more precisely through its nozzle opening 16a, on the workpiece 8, specifically in the example shown on a focal position F on the upper side 8a of the workpiece 8. The laser beam 6 forms an interaction region 17 there with the workpiece 8, behind which, against the processing direction Bφ or against the cutting direction of the laser cutting process, the kerf 9 shown in FIG. 1 is generated. In the case of a laser beam 6 from a solid-state laser, a focusing lens made of, for example quartz glass can be used.

A partially transmissive deflection mirror 18 can also be seen in FIG. 2, which reflects the incident laser beam 2 (for example having a wavelength of approximately 10.6 μm) and transmits observation radiation relevant for process monitoring to a further partially transmissive deflection mirror 19. The deflection mirror 18 is partially transmissive in the example shown for observation radiation in the form of thermal radiation at wavelengths λ of approximately 700 nm to 2000 nm. The further partially transmissive deflection mirror 19 reflects the observation radiation to a monitoring device 20. An illumination source 21 is used for the coaxial illumination of the workpiece 8 with illumination radiation 22. The illumination radiation 22 is transmitted by the further partially transmissive deflection mirror 19 and by the deflection mirror 18 and guided through the nozzle opening 16a of the laser processing nozzle 16 onto the workpiece 8.

Alternatively to the partially transmissive deflection mirrors 18, 19, scraper mirrors or perforated mirrors, which reflect incident radiation only from an edge region, can also be used in order to supply the observation radiation to the monitoring device 20 or to supply the illumination radiation 22 to the workpiece 8. At least one mirror introduced laterally into the beam path of the laser beam 6 can also be used in order to enable the observation.

Diode lasers or LEDs or flash lamps can be provided as the illumination source 21, which can be arranged coaxially as shown in FIG. 2a, or also off-axis with respect to the laser beam axis 24. The illumination source 21 can also be arranged, for example, outside (in particular adjacent to) the laser processing head 4 and oriented on the workpiece 8; alternatively the illumination source 21 can be arranged inside the laser processing head 4, but not aligned coaxially to the laser beam 6 on the workpiece 8. The laser processing head 4 can possibly also be operated without an illumination source 21.

A geometrically high-resolution camera 25 arranged behind the further partially transmissive deflection mirror 19 in the observation beam path 23 is part of the monitoring device 20. The camera 25 can be a high-speed camera which is arranged coaxially to the laser beam axis 24 or to the extension of the laser beam axis 24 and thus in a direction-independent manner. In the illustrated example, images are recorded by the camera 25 in the incident light method in the NIR/IR wavelength range, in order to record the process intrinsic light or a thermal image of the cutting process. In the example shown in FIG. 2a, a filter can be arranged in front of the camera 25 if further radiation or wavelength components are to be excluded from the acquisition by the camera 25. The filter can be designed, for example, as a narrowband bandpass filter having a full width at half maximum of, for example, approximately 15 nm, which transmits wavelengths λ in the range around approximately 800 nm.

Figure 3:
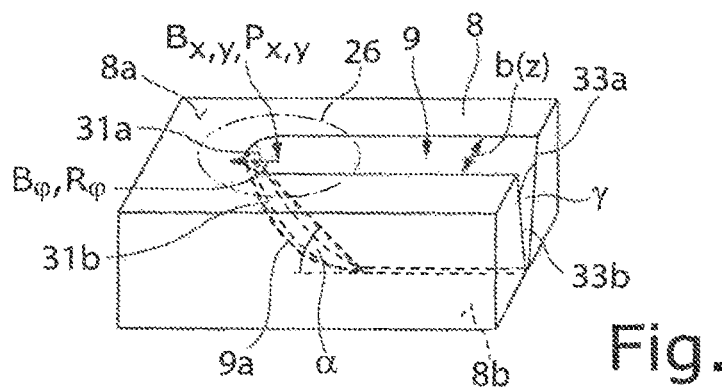
FIG. 3 shows a three-dimensional illustration of a detail of a kerf formed during the laser cutting process on a workpiece.

To generate images of a region 26 of the workpiece 8 to be monitored as shown in FIG. 3, which contains the kerf 9 or a section of the kerf 9 with the cutting front 9a, on a detector surface 25a of the camera 25, the monitoring device 20 has an imaging optical unit 27. In the example shown, the imaging optical unit 27 has an aperture 28, which is rotatably mounted around a central rotational axis D, so that during the rotation the position of an eccentrically arranged aperture opening 28a moves on a circular arc around the rotational axis D (cf. FIG. 2b).

Due to the arrangement of the aperture 28 in the beam path of the imaging optical unit 27 focused by means of a lens 29, only a part of the observation beam path 23, which passes through an edge region of the focusing lens 15 and is aligned in the convergent beam path after the focusing lens 15 at an angle β to the beam axis 24 of the laser beam 6, passes through the aperture opening 28a arranged eccentrically to the extension of the beam axis 24 of the laser beam 6 and forms an observation beam 23a, which is imaged on the detector surface 25a. In the example shown in FIG. 2a, an observation direction R1 of the observation beam 23a extends in the projection in the XY plane or in the workpiece plane parallel to the processing direction Bφ (here: φ=0), along which the laser beam 6 and the workpiece 8 are moved relative to one another in the XY plane in order to form the desired cut contour, i.e., a piercing observation takes place. The angle β, at which the observation direction R1 is aligned with respect to the beam axis 24 of the laser beam 6, is in the example shown between approximately 1° and approximately 5°, for example at approximately 4°.

As can be seen in FIG. 2a, a polarization filter 30 is attached to the aperture 28, which rotates together with the aperture 28 around the rotational axis D. The polarization filter 30 is designed to filter a linear polarization component p, which is aligned in the example shown parallel to a plane (XZ plane), which contains the (instantaneous) processing direction Bφ and the Z direction or the beam axis 24 of the laser beam 6. As can be seen in FIG. 2a, after the polarization filter 30, the observation beam 23a only still has a polarization component s aligned perpendicularly to the XZ plane. The filtering of a linear polarization component of the observation beam 23a has proven to be advantageous for the observation of the kerf 9 or the region 26 to be monitored. It is apparent that, instead of the polarization component p aligned parallel to the XZ plane, the polarization component s aligned perpendicularly to the XZ plane or a differently aligned polarization component can also possibly be filtered with the aid of the polarization filter 30. The use of the s-polarized polarization component has proven to be particularly advantageous for the observation of the kerf 9, since the dashed lines shown in FIG. 3, which essentially correspond to two light strips 31a,b, have an optimum angle to emit a large amount of s-polarized radiation.

Instead of a mechanically adjustable aperture 28, an electrically adjustable aperture can also be used, for example in the form of an LCD array, in which individual pixels or pixel groups are switched on or off electronically to generate the aperture effect. The mechanical aperture 28 can also be moved or displaced, differently than shown in FIG. 2a,b, transversely to the observation beam path 23, for example in the YZ plane, in order to shade different parts of the observation beam path 23 or open them for observation. The aperture 28 can also be implemented in the form of one or more mechanical elements that can be folded open and closed. Correspondingly, the polarization filter 30 can also be designed as an LCD polarizer, in order to suitably select the alignment of the filtered polarization component, in particular to rotate the alignment of the filtered polarization component. The aperture 28 and/or the polarization filter 30 can optionally be removed completely from the observation beam path 23, if this is advantageous for the monitoring of the laser cutting process.

With the aid of an evaluation device 32 having a signaling connection to the monitoring device 20, different parameters can be determined for the process quality of the laser cutting process. For the evaluation of the images recorded or generated by a camera (as part of the monitoring device 20), the evaluation device 32 comprises an image processing unit which can be a computation unit or a microprocessor. For example, based on the course of the light strips 31a,b shown in FIG. 3, the course of the gap width b(z) of the kerf 9 in the thickness direction Z of the workpiece 8 (with thickness d), more precisely an angle γ between the two lateral cut flanks 33a,b of the kerf 9 can be concluded. The distance and/or the angle between the two light strips 31a, b can be determined with the aid of the evaluation device 32 as measured variables for the angle γ, for example as described in WO2018069291A1, cited at the outset, which is made part of the content of this application in its entirety by reference. For example, the distance between the two light strips 31a,b can be detected in an image by observing two intensity maxima in the Y direction transverse to the movement direction of the processing head 4. The opening angle γ between the two cut flanks 33a,b of the kerf 9 represents a parameter for the process quality or for the process robustness, typically in fusion cutting, i.e., the larger the opening angle γ, the more strongly the V shape of the kerf 9 is pronounced and the worse the cutting quality typically is.

As can also be seen in FIG. 3, the essentially cylindrical cutting front 9a forms during the cutting processing on the workpiece 8 at the front edge of the kerf 9, which cutting front extends along the thickness d of the workpiece 8 at a cutting front angle α with respect to the upper side 8a and the lower side 8b of the workpiece 8. The cutting front angle α can be determined with the aid of the monitoring device 20 based on the monitored region 26, more precisely based on the interaction region 17, with the aid of the evaluation device 32. This can be carried out, for example, in a way as described in WO2015036140A1, cited at the outset, which is made part of the content of this application in its entirety by reference. In this case it is favorable for the determination of the cutting front angle α if the observation of the interaction region 17 takes place with a trailing or piercing observation direction, wherein the use of the polarization filter 30 can be omitted. Alternatively, the cutting front angle α can also be determined based on geometry features of the kerf 9, for example as described in WO2012107331A1, cited at the outset, which is also made part of the content of this application in its entirety by reference.

With the aid of the monitoring device 20 or the evaluation device 32, other parameters for the process quality, for example the positioning accuracy $P_{X,Y}$ in the positioning of the laser processing head 4 at the processing position $B_{X,Y}$, i.e., the deviation between actual and target processing position and the directional accuracy $R_φ$, i.e., the deviation of the instantaneous processing direction Bφ at the processing position $B_{X,Y}$ from a target processing direction can also be determined. The directional inaccuracy $R_φ$ can also be determined by the monitoring device 20 in combination with the evaluation device 32, for example, in that the method described in DE102005022095A1 for determining the lateral relative movement between the laser processing head 4 and the workpiece 8 is carried out and the lateral relative movement or instantaneous processing direction $B_φ$ determined in this way is compared to a value for the target processing direction, which is stored in the evaluation device 32 or at another location. The positioning accuracy $P_{X,Y}$ and the directional accuracy $R_φ$ represent parameters for the process quality, since, in the event of deviations from the respective target value, deviations of the geometry of the kerf 9 from a target geometry occur.

It is apparent that other parameters for the process quality can also be determined with the aid of the monitoring device 20 or the evaluation device 32, which relate, for example, to the occurrence of a burr formation on the kerf 9, etc., as is also described in WO2012107331A1. The type of the parameter(s) for the process quality which are determined in the evaluation device 32 can be dependent on the type of the laser cutting process, for example the cutting front angle α can be used as a parameter in a flame cutting process, while the opening angle γ of the kerf is typically used as a parameter for the process quality in a fusion cutting process.

A control device 34 shown in FIG. 1, which assumes control tasks of the laser cutting machine 1, has a signaling connection to the evaluation device 32. The control device 34 has a regulating device 35, in order to produce an optimum process quality in the processing process. The regulating device 35 can be designed, for example, to regulate the cutting front angle α to a predetermined, constant value, in that at least one control parameter, for example the feed speed and/or the power of the laser beam 6 is influenced suitably.

In the following, it is described by way of example for the cutting front angle α as a parameter for the process quality how position-dependent and/or direction-dependent faults during the processing of the workpiece 8 are determined by means of the processing machine 1. As was described further above, the cutting front angle α is continuously detected by the monitoring device 20 during the cutting process. A respective instantaneously determined measured value of the cutting front angle α is assigned to the instantaneous processing position $B_{X,Y}$ which corresponds in the example shown to an XY coordinate in the working area of the processing machine 1. The assignment can be stored, for example, in a database or the like, which is stored in the evaluation device 32, the control device 34, or in a data memory 36, which is possibly provided on an external central computer or in the cloud. The assignment of the cutting front angle α to the respective processing positions $B_{X,Y}$ in the working area is performed for a plurality of cutting processing processes and thus for a plurality of measured values $α_1, α_2, \ldots α_N$, wherein N describes the number of the measured values, which is typically greater than N=10. A cutting front angle α(X, Y) dependent on the XY coordinate or the XY position in the working area is determined from the measured values $α_1, α_2, \ldots α_N$, which were determined at a respective processing position $B_{X,Y}$, i.e., at a respective XY coordinate, in the working area. The position-dependent cutting front angle α(X, Y) is thus a function in dependence on the XY coordinate.

To eliminate the influence of the respective processing process or the respective processing parameters on the position-dependent cutting front angle α(X,Y), a statistical analysis of the plurality N of measured values $α_1, α_2, \ldots α_N$ is carried out, which were determined at different times or in different processing processes at the respective processing position $B_{X,Y}$. In the simplest case, to determine the position-dependent cutting front angle α(X, Y), the mean value can be calculated from the measured values $α_1, α_2, \ldots α_N$ at the respective processing position $B_{X,Y}$. It is apparent that, instead of the mean value, another suitable statistical measure can also be used for determining the position-dependent cutting front angle α(X, Y), which eliminates as completely as possible the influence of faults which are not dependent on the respective processing position $B_{X,Y}$.

Based on the position-dependent cutting front angle α(X, Y) in the working area, processing positions $B_{X,Y}$ can be determined, at which the position-dependent cutting front angle α(X,Y) is sufficiently small that the process quality is low or the process possibly no longer runs stably. To determine these processing positions $B_{X,Y}$, the position-dependent cutting front angle α(X,Y) can be compared to a threshold value (generally constant, i.e., not dependent on the position). The processing positions $B_{X,Y}$, at which the threshold value is undershot, form subsections in the form of fault position regions 37 within the working area, of which two are shown by way of example in FIG. 1. The subsections of the working area which lie outside the fault position regions 37 form preferred position regions for the cutting process on the workpiece 8.

During the path planning in the control device 34, the cut contours, to be produced during the cutting, of the workpiece parts to be cut out of the workpiece 8 are selected so that they ideally lie completely outside the fault position regions 37 or so that the smallest possible part of the processing process takes place within the fault position regions 37. The fault position regions 37 of the processing machine 1 determined in the way described further above can be stored in the data memory 36.

The determination of the fault position regions 37 in the way described further above can possibly be repeated at predetermined time intervals. If a sufficiently large number of measured values $α_1, α_2, \ldots α_N$ is used for the determination of the position-dependent cutting front angle α, the fault position regions 37 generally do not change or only change insignificantly, i.e., they are essentially chronologically constant. The information about the fault position regions 37 of a plurality of processing machines 1 of identical construction can be stored in a common data memory 36. Weak points of the machine construction can be recognized based on the data stored therein about the fault position regions 37 and/or about the position-dependent cutting front angle α(x, y).

Similarly to the determination, described further above, of the position-dependent cutting front angle α(X,Y), the cutting front angle α can also be determined in dependence on the processing direction $B_φ$. In the simplest case, an instantaneously determined measured value for the cutting front angle α is assigned herein to a respective instantaneous processing direction $B_φ$—without consideration of the respective processing position $B_{X,Y}$—i.e., the direction-dependent cutting front angle αφ of the processing machine 1 is determined independently of the processing position $B_{X,Y}$, in that a plurality of measured values for the direction-dependent cutting front angle αφ is statistically evaluated in the way described further above. The direction-dependent cutting front angle $α_φ$ is preferably additionally determined in dependence on the processing position $B_{X,Y}$, however, i.e., the direction-dependent cutting front angle $α_φ$ is determined based on a plurality of measured values $α_1, α_2, \ldots α_N$ in a respective processing direction $B_φ$ at one and the same processing position $B_{X,Y}$. The direction-dependent cutting front angle $α_φ$ (X, Y) is thus additionally dependent on the XY position in the working area.

Similarly to the determination, described further above, of the fault position regions 37, fault angle regions 38 can also be determined, which are possibly dependent on the respective processing position $B_{X,Y}$ (see above). For example, for this purpose, the respective value for the direction-dependent cutting front angle $α_φ$ can be compared to a threshold value. In FIG. 1, a fault angle region 38 at a processing position $B_{X,Y}$ is shown by way of example, which extends over an angle interval φ between approximately 35° and approximately 45°. As described further above in conjunction with the fault position regions 37, the processing directions $B_φ$ in the processing of the workpiece 8 can also be selected so that the fault angle regions 38 are avoided as much as possible during the processing. The direction-dependent, typically additionally position-dependent cutting front angle $α_φ$ (X, Y) or the fault angle region(s) 38 can also be stored in the data memory 36 to be able to carry out an error diagnosis or to optimize the work planning.

As was described further above, the cutting front angle α can be regulated to a predetermined, constant value, in that at least one control parameter, for example the feed speed and/or the power of the laser beam 6, is suitably influenced. In the case of an (ideal) regulation, the regulated variable is constant, i.e., it is not dependent on the position and/or on the direction, but the measured variable(s) used for the regulation can vary depending on the position and/or direction due to faults, which is to be considered in the regulation in order to keep the regulated variable constant, in the example described here the cutting front angle α.

During the laser cutting over a web of the workpiece support 5, for example, a high measurement signal of an optical laser cutting sensor system can result, which detects the process radiation as a measured variable. At such a processing position $B_{X,Y}$, therefore either no regulation at all can take place or a high value of the measured variable has to be expected, in order to keep the regulated variable, for example the cutting front angle α, constant. In this case, the measurement signal of the process radiation is a position-dependent parameter, which is determined with the aid of the above-described method and the variation of which dependent on the processing position $B_{X,Y}$ is taken into consideration in the regulation of the regulated variable to its target value. It is apparent that such a procedure is also possible for other parameters.

In the case of laser cutting using a laser beam 6 having an oval beam cross section, which is induced, for example, by a non-round inner contour 16a of the nozzle 16, for the regulation of the kerf 9 to a constant width b (regulated variable), for example the focal position F of the laser beam 6 in the propagation direction of the laser beam 6 (in the Z direction) can be adjusted as a control variable. If a cut is made with the long side of the laser beam 6 transverse to the kerf 9, the focal position F is to be selected so that the beam cross section of the laser beam 6 on the workpiece 9 is small, while, in the case of cutting with the narrow laser beam side transverse to the kerf 9, the beam cross section is to be set large in the focus, so that overall the width b of the kerf 9 can be kept constant. In this case, a direction-dependent setting of the focal position in the Z direction is thus required.

With increasing operating time of the laser processing machine 1, soiling, for example, of the focusing lens 15 can occur. The soiling can lead to a so-called thermal lens, which results in a change of the focal position F (deviation from a nominal focal position). If the focal position F (in the propagation direction) of the laser beam 6 is determined as a parameter in multiple temporally successive processing processes on the laser processing machine 1, it can therefore be reasonable to take into consideration a temporal change of the measured values in the determination of the direction-dependent and/or position-dependent focal position F. For example, in the determination of the focal position F, only those measured values can be taken into consideration which were determined during processing processes not that long ago and therefore correspond to the present degree of soiling of the focusing lens 15.

It is apparent that the method described further above can also be carried out in a similar manner using parameters for the process quality other than the cutting front angle $\alpha$, the focal position F, etc.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A processing machine, the processing machine comprising:
   a processing tool configured for processing of a workpiece;
   a movement device configured to move the processing tool relative to the workpiece;
   a monitoring device configured to monitor a region on the workpiece; and
   an evaluation device, which is configured to determine at least one parameter for a process quality based on the monitored region,
   wherein the evaluation device is configured to determine at least one position-dependent parameter for the process quality based on a plurality of measured values of the at least one parameter at a same processing position, or at least one direction-dependent parameter for the process quality based on the plurality of measured values of the at least one parameter along a same processing direction,
   wherein the evaluation device is configured to determine, based on the position-dependent parameter, processing positions which form at least one fault position region during the processing, or to determine, based on the direction-dependent parameter, processing directions, which form at least one fault angle region during the processing.

2. The processing machine as claimed in claim 1, wherein the evaluation device is configured to carry out a statistical analysis of the plurality of measured values to determine the position-dependent parameter or the direction-dependent parameter for the process quality.

3. The processing machine as claimed in claim 1, wherein the monitoring device is configured to monitor the at least one parameter continuously, and wherein the evaluation device is configured to assign an instantaneously determined measured value of the parameter to a respective processing position or to a respective processing direction.

4. The processing machine as claimed in claim 1, the processing machine further comprising: a control device configured to control the movement of the processing tool relative to the workpiece.

5. The processing machine as claimed in claim 1, wherein the monitoring device and the evaluation device are configured to determine, based on the monitored region, as a parameter for the process quality, a cutting front angle of a cutting front of a kerf, an opening angle between two cut flanks of the kerf, a positioning accuracy, or a directional accuracy during the movement of the processing tool and the workpiece relative to one another.

6. The processing machine as claimed in claim 4, wherein the control device is configured to define processing positions or processing directions during the movement of the processing tool relative to the workpiece in dependence on the determined position-dependent parameter including on the at least one fault position region, or based on the direction-dependent parameter including on the at least one fault angle region.

7. The processing machine as claimed in claim 2, wherein the position-dependent parameter or the direction-dependent parameter for the process quality is determined as a mean value or a median value of the plurality of measured values.

* * * * *